US011862891B2

(12) United States Patent
Karita

(10) Patent No.: US 11,862,891 B2
(45) Date of Patent: Jan. 2, 2024

(54) CONNECTOR HAVING INNER CONNECTOR AND INNER HOUSING

(71) Applicant: SUMITOMO WIRING SYSTEMS, LTD., Mie (JP)

(72) Inventor: Masahiro Karita, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 134 days.

(21) Appl. No.: 17/612,199

(22) PCT Filed: May 14, 2020

(86) PCT No.: PCT/JP2020/019197
§ 371 (c)(1),
(2) Date: Nov. 17, 2021

(87) PCT Pub. No.: WO2020/241268
PCT Pub. Date: Dec. 3, 2020

(65) Prior Publication Data

US 2022/0224041 A1 Jul. 14, 2022

(30) Foreign Application Priority Data

May 31, 2019 (JP) ................................ 2019-102322

(51) Int. Cl.
*H01R 13/506* (2006.01)

(52) U.S. Cl.
CPC ....... *H01R 13/506* (2013.01); *H01R 2201/26* (2013.01)

(58) Field of Classification Search
CPC .. H01R 13/502; H01R 13/506; H01R 13/516; H01R 13/6593
See application file for complete search history.

(56) References Cited

U.S. PATENT DOCUMENTS

| | | | | |
|---|---|---|---|---|
| 5,683,272 | A | 11/1997 | Abe | |
| 10,833,456 | B2 * | 11/2020 | Maesoba | H01R 13/6582 |
| 11,031,720 | B2 * | 6/2021 | Miyamura | H01R 13/447 |
| 11,217,943 | B2 * | 1/2022 | Maesoba | H01R 13/111 |
| 2018/0261933 | A1 | 9/2018 | Maesoba et al. | |

(Continued)

FOREIGN PATENT DOCUMENTS

JP H10-189114 A 7/1998

OTHER PUBLICATIONS

International Search Report dated Jul. 7, 2020 for WO 2020/241268 A1 (4 pages).

*Primary Examiner* — Oscar C Jimenez
(74) *Attorney, Agent, or Firm* — Venjuris, P.C.

(57) ABSTRACT

A connector in the present disclosure is a connector 10 provided with an inner conductor 20 and an inner housing 30. The inner housing 30 is formed by assembling a first housing 31 and at least one second housing 42 with each other. The first housing 31 includes a first side wall 34 and the second housing 42 includes a second side wall 46. The second side wall 46 is arranged from a protection wall 43 to overlap the first side wall 34. The first and second side walls 34, 46 include a slide mechanism 50. The slide mechanism 50 includes a fitting portion 36 on either one of the first and second side walls 34, 46 and a fitting hole 47 in the other side wall. The fitting hole 47 is formed to be longer in a front-rear direction than the fitting portion 36.

5 Claims, 12 Drawing Sheets

(56) References Cited

U.S. PATENT DOCUMENTS

| | | | | |
|---|---|---|---|---|
| 2019/0006785 | A1* | 1/2019 | Maesoba ............ | H01R 13/4364 |
| 2019/0013614 | A1* | 1/2019 | Matsui ............... | H01R 13/4361 |
| 2019/0252806 | A1 | 8/2019 | Maesoba et al. | |
| 2019/0319389 | A1 | 10/2019 | Hara et al. | |
| 2021/0351521 | A1* | 11/2021 | Karita ................ | H01R 13/6593 |

* cited by examiner

CONNECTOR HAVING INNER CONNECTOR AND INNER HOUSING

CROSS REFERENCE TO RELATED APPLICATIONS

This application is a national phase of PCT application No. PCT/JP2020/019197, filed on 14 May 2020, which claims priority from Japanese patent application No. 2019-102322, filed on 31 May 2019, all of which are incorporated herein by reference.

TECHNICAL FIELD

The present disclosure relates to a connector.

BACKGROUND

For example, a connector for high-speed communication provided with a dielectric, in which a plurality of inner conductors are mounted, is known from Japanese Patent Laid-Open Publication No. 2018-147817 (Patent Document 1 below).

The dielectric in this connector includes a first component having a pair of side wall portions on both lateral end parts and a second component having a pair of side plate portions on both lateral end parts. The first and second components are united with each other to configure the dielectric by locking lock protrusions constituting lock grooves formed by recessing the pair of side wall portions and lock ribs formed to project on the pair of side plate portions in a vertical direction.

The second component is slidable in a front-rear direction between a protection position where a male terminal is protected by being concealed and an exposed position where the male terminal is exposed by the lock protrusions and the lock ribs sliding on each other in the front-rear direction while being held in contact with each other.

PRIOR ART DOCUMENT

Patent Document

Patent Document 1: JP 2018-147817 A

SUMMARY OF THE INVENTION

Problems to be Solved

According to the above connector, a slide mechanism for sliding the second component with respect to the first component needs to secure dimensions of locking margins for locking the lock ribs and the lock protrusions in the vertical direction between the side wall portions and the side plate portions in addition to thicknesses of the side wall portions and the side plate portions. Thus, the connector is enlarged in thickness directions of the side wall portions and the side plate portions.

However, if the second component is disable to slide with respect to the first component because the slide mechanism is enlarged, the male terminal cannot be protected.

In this specification, a technique for reducing a size of a slide mechanism is disclosed.

Means to Solve the Problem

The present disclosure is directed to a connector with at least one inner conductor, and an inner housing, wherein the inner housing is formed by assembling a first housing and at least one second housing with each other, the first housing includes a placing portion and at least one first side wall, the inner conductor includes a terminal connecting portion, the terminal connecting portion is formed to extend forward, the inner conductor is so arranged on the placing portion that the terminal connecting portion projects forward, the first side wall extends from the placing portion toward the second housing, the second housing includes a protection wall and at least one second side wall, the protection wall is formed to be larger than the terminal connecting portion projecting from the placing portion, the second side wall is arranged from the protection wall to overlap the first side wall, the first and second side walls include a slide mechanism, the slide mechanism includes a fitting portion on either one of the first and second side walls to project toward the other side wall and a fitting hole in the other side wall, the fitting portion being fit into the fitting hole, and the fitting hole is formed to be longer in a front-rear direction than the fitting portion.

Effect of the Invention

According to the present disclosure, a slide mechanism can be reduced in size.

DETAILED DESCRIPTION TO EXECUTE THE INVENTION

Description of Embodiments of Present Disclosure

Figure 1:
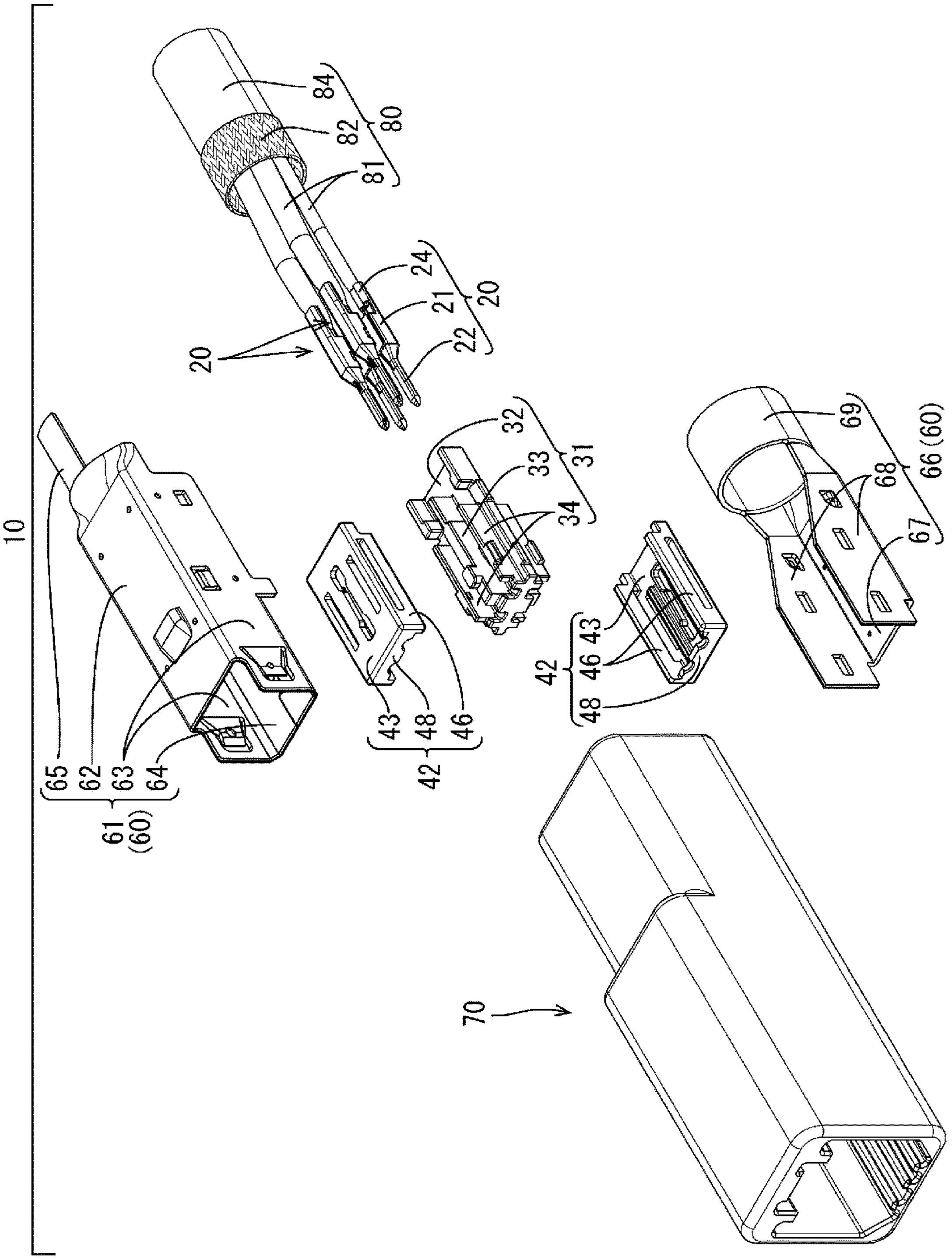
FIG. 1 is an exploded perspective view of a connector of a first embodiment.

First, embodiments of the present disclosure are listed and described.

(1) The connector of the present disclosure includes at least one inner conductor, and an inner housing, wherein the inner housing is formed by assembling a first housing and at least one second housing with each other, the first housing includes a placing portion and at least one first side wall, the inner conductor includes a terminal connecting portion, the terminal connecting portion is formed to extend forward, the inner conductor is so arranged on the placing portion that the terminal connecting portion projects forward, the first side wall extends from the placing portion toward the second housing, the second housing includes a protection wall and at least one second side wall, the protection wall is formed to be larger than the terminal connecting portion projecting from the placing portion, the second side wall is arranged from the protection wall to overlap the first side wall, the first and second side walls include a slide mechanism, the slide mechanism includes a fitting portion on either one of the first and second side walls to project toward the other side wall and a fitting hole in the other side wall, the fitting portion being fit into the fitting hole, and the fitting hole is formed to be longer in a front-rear direction than the fitting portion.

The slide mechanism for moving the second housing with respect to the first housing is configured by fitting the fitting portion on either one of the first and second side walls into the fitting hole in the other side wall.

That is, the slide mechanism is formed in a dimensional range equivalent to the sum of a thickness of the first side wall and a thickness of the second side wall. In this way, the slide mechanism can be reduced in size as compared to a conventional connector required to secure the sum of thicknesses of first and second side walls and a width of mutually locking parts.

(2) Two inner conductors are arranged side by side in an overlapping direction of the first and second side walls on the placing portion, and a separation wall having a thickness larger than that of the slide mechanism is arranged between the adjacent inner conductors.

Generally, if a ratio of a metal conductor increases around an inner conductor in which a signal flows, impedance is reduced.

However, in this connector, an interval between the adjacent inner conductors can be set to be larger than a thickness of the slide mechanism.

That is, an impedance reduction in each inner conductor can be suppressed by increasing the interval between the inner conductors.

Details of Embodiment of Present Disclosure

A specific example of a connector of the present disclosure is described below with reference to the drawings. Note that the present disclosure is not limited to these illustrations and is intended to be represented by claims and include all changes in the scope of claims and in the meaning and scope of equivalents.

First Embodiment

A first embodiment in the present disclosure is described with reference to FIGS. 1 to 10.

A connector 10 of the first embodiment is a connector for high-speed communication installed in a vehicle.

Figure 2:
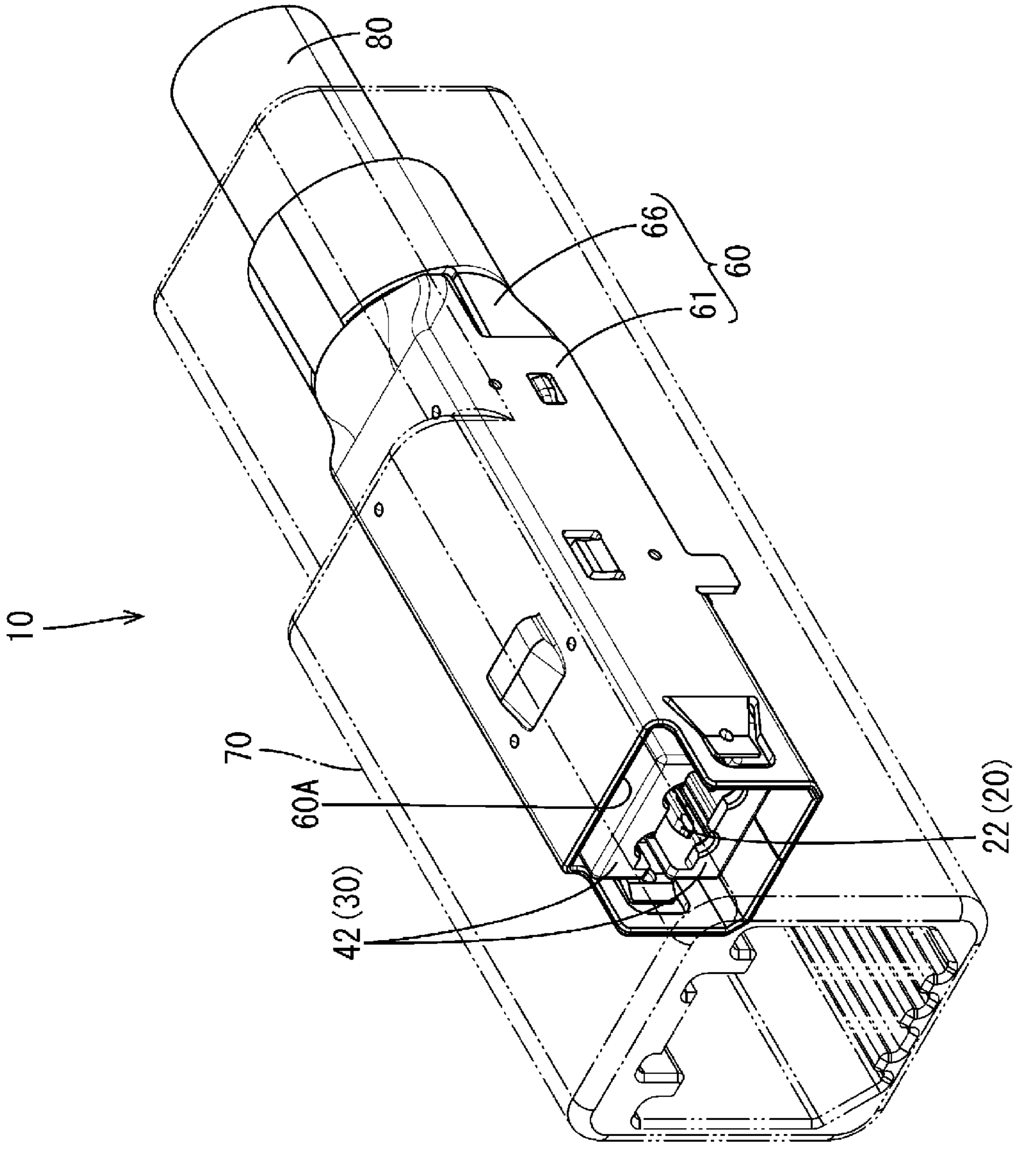
FIG. 2 is a perspective view of the connector.

As shown in FIGS. 1 and 2, the connector 10 includes a plurality of inner conductors 20, an inner housing 30, an outer conductor 60 and an outer housing 70.

[Inner Conductors 20]

Each of the plurality of inner conductors 20 is formed by processing a conductive metal plate material. In the first embodiment, four inner conductors 20 are provided. As shown in FIG. 1, the inner conductor 20 is a male terminal and includes a terminal body 21, a terminal connecting portion 22 and a wire connecting portion 24.

The terminal body 21 is in the form of a rectangular tube long in a front-rear direction. The terminal connecting portion 22 is formed in front of and continuous with the terminal body 21 in a front end part of the inner conductor 20. The terminal connecting portion 22 is in the form of an elongated rectangular column extending forward from the terminal body 21. The wire connecting portion 24 is formed behind and continuous with the terminal body 21. The wire connecting portion 24 is crimped to a front end part of a shielded cable 80.

[Shielded Cable 80]

As shown in FIG. 1, the shielded cable 80 includes a plurality of wires (four in the first embodiment) 81, a braided wire 82 for covering the outer peripheries of the plurality of wires 81 and an outer sheath 84 for covering the outer periphery of the braided wire 82.

In the front end part of the shielded cable 80, the braided wire 82 and the outer sheath 84 are stripped to expose the four wires 81.

Out of the exposed four wires 81, two arranged on a lower side are the wires 81 for power supply. Two arranged on an upper side are the wires 81 for signal having a larger wire diameter than the two on the lower side.

In the front end parts of the exposed four wires 81, the wire connecting portions 24 of the inner conductors 20 are respectively crimped to cores exposed by stripping coatings. In this way, the respective wires 81 and the inner conductors 20 are electrically connected.

Behind the exposed parts of the four wires 81, the braided wire 82 exposed by stripping only the outer sheath 84 is folded on the outer periphery of the outer sheath 84.

[Inner Housing 30]

The inner housing 30 is made of insulating synthetic resin.

Figure 3:
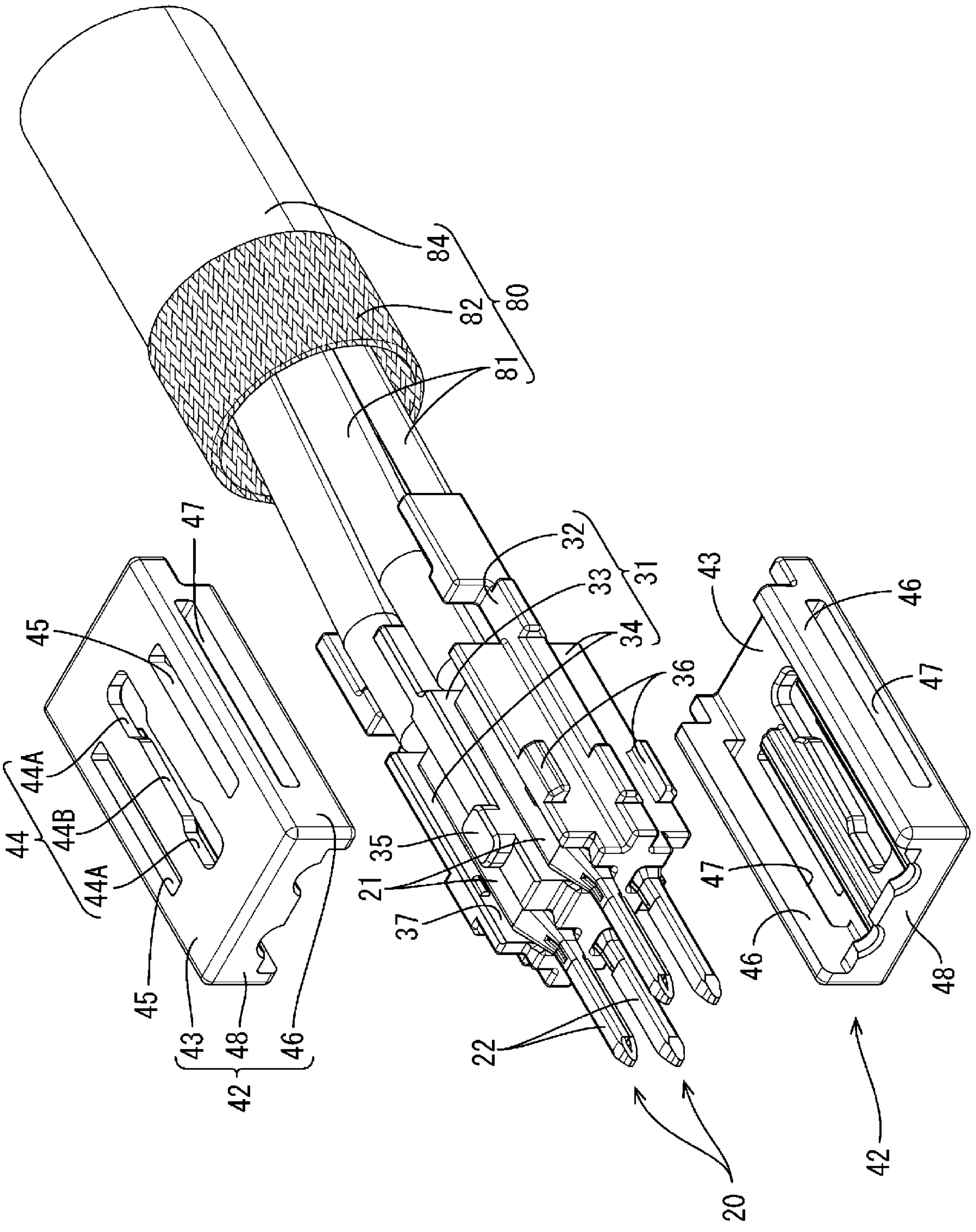
FIG. 3 is a perspective view showing a state before a pair of second housings are assembled with a first housing.
Figure 4:
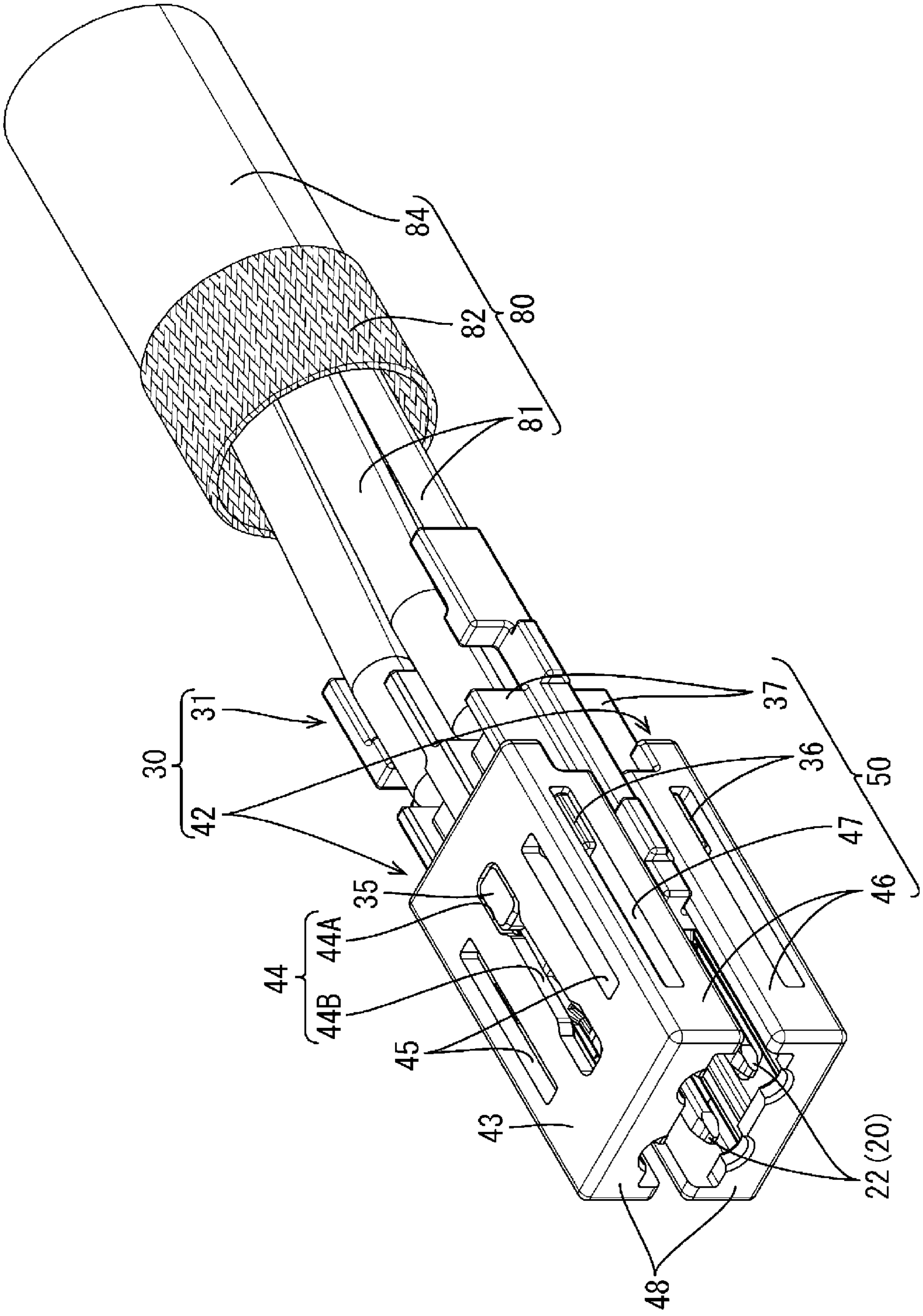
FIG. 4 is a perspective view showing a state where the pair of second housings are assembled at a protection position with respect to the first housing.

As shown in FIGS. 1, 3 and 4, the inner housing 30 is formed by assembling a first housing 31 and two second housings 42 with each other in a vertical direction.

As shown in FIGS. 1 and 3, the first housing 31 includes a placing portion 32, a separation wall 33 and a pair of first side walls 34.

The placing portion 32 is in the form of a rectangular plate having a longer dimension in the front-rear direction than a width in a lateral direction.

The separation wall 33 is formed in a laterally central part of the placing portion 32 while penetrating through the placing portion 32 in the vertical direction. The separation wall 33 is in the form of a rectangular plate longer in the front-rear direction than the terminal bodies 21 of the inner conductors 20. The separation wall 33 is formed to extend in the vertical direction from the placing portion 32 more than heights of the terminal bodies 21.

Positioning protrusions 35 projecting in a direction away from the placing portion 32 are formed on tip parts of the separation wall 33.

The pair of first side walls 34 are respectively formed at positions somewhat inward of both lateral side edge parts of the placing portion 32. Each first side wall 34 is in the form of a rectangular plate longer in the front-rear direction than the terminal bodies 21 of the inner conductors 20 while penetrating through the placing portion 32 in the vertical direction. The first side wall 34 is larger in the vertical direction than the heights of the terminal bodies 21 to extend toward the second housings 42. Fitting portions 36 are formed on tip parts of each first side wall 34.

The respective fitting portions 36 are formed to extend in the front-rear direction along the tip parts of the first side walls 34 and project in the lateral direction to be away from each other.

A region surrounded by the placing portion 32, the separation wall 33 and the first side wall 34 serves as a terminal accommodating portion 37 for accommodating the terminal body 21 and the wire connecting portion 24 of the inner conductor 20 together with a protection wall 43 of the second housing 42. That is, the inner housing 30 is formed with two terminal accommodating portions 37 arranged in the lateral direction in each of two upper and lower stages.

When the inner conductor 20 is accommodated into the terminal accommodating portion 37, the terminal connecting portion 22 projects forward from the terminal accommodating portion 37 as shown in FIG. 3. Thus, four inner conductors 20 are so arranged on the placing portion 32 that the terminal connecting portions 22 project forward and two inner conductors 20 are arranged in each of the vertical direction and lateral direction.

As shown in FIGS. 3 to 9, the two second housings 42 are assembled with the first housing 31 in the vertical direction. Each second housing 42 includes the protection wall 43, a pair of second side walls 46 and a front wall 48.

Figure 10:
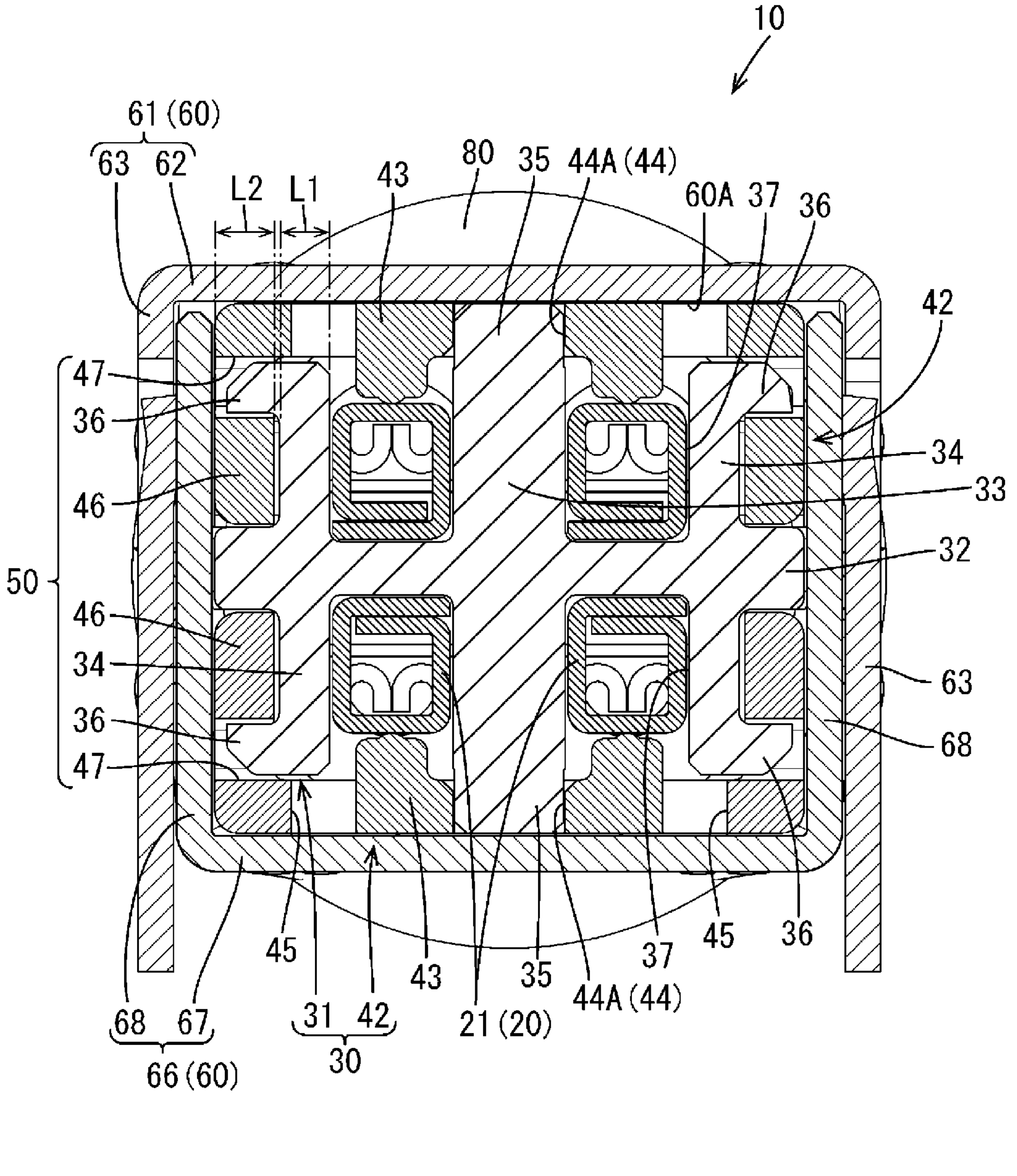
FIG. 10 is a section along X-X of FIG. 9.

The protection wall 43 is in the form of a rectangular plate longer in the front-rear direction and lateral direction than the placing portion 32 of the first housing 31. In this way, if the second housing 42 is assembled with the first housing 31, the protection wall 43 surrounds the outer peripheries of a pair of inner conductors 20 together with the placing portion 32, the separation wall 33 and the first side walls 34 as shown in FIG. 10.

Figure 5:
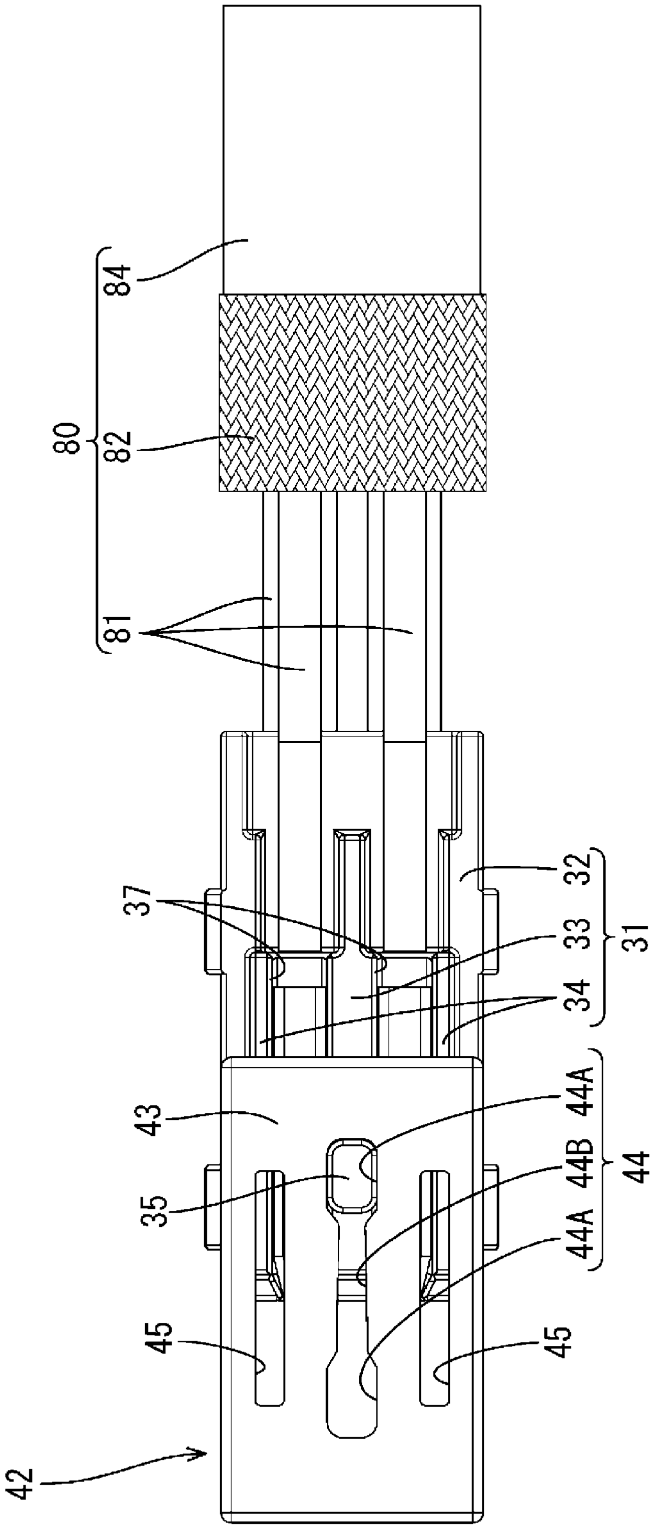
FIG. 5 is a plan view showing the state where the pair of second housings are assembled at the protection position with respect to the first housing.

As shown in FIGS. 3 to 5, a positioning hole 44 into which the positioning protrusion 35 of the first housing 31 is fit is formed to penetrate through the protection wall 43 in the vertical direction in a laterally central part of the protection wall 43.

The positioning hole 44 is formed to extend in the front-rear direction more than the positioning protrusion 35. Front and rear end parts of the positioning hole 44 serve as protrusion holding holes 44A formed to be slightly larger than a lateral width of the positioning protrusion 35, and a region of the positioning hole 44 between the protrusion holding holes 44A serves as a narrow hole 44B somewhat narrower than the width of the positioning protrusion 35.

Deformation holes 45 are formed to penetrate through the protection wall 43 in the vertical direction on both lateral sides of the positioning hole 44.

The deformation holes 45 are formed to be somewhat shorter in the front-rear direction than the positioning hole 44.

As shown in FIGS. 3 and 10, the pair of second side walls 46 are formed to extend toward the first housing 31 to overlap outside the first side walls 34 on both lateral side edge parts of the protection walls 43. The second side walls 46 are in the form of rectangular plates longer in the front-rear direction than the terminal bodies 21 of the inner conductors 20.

Figure 6:
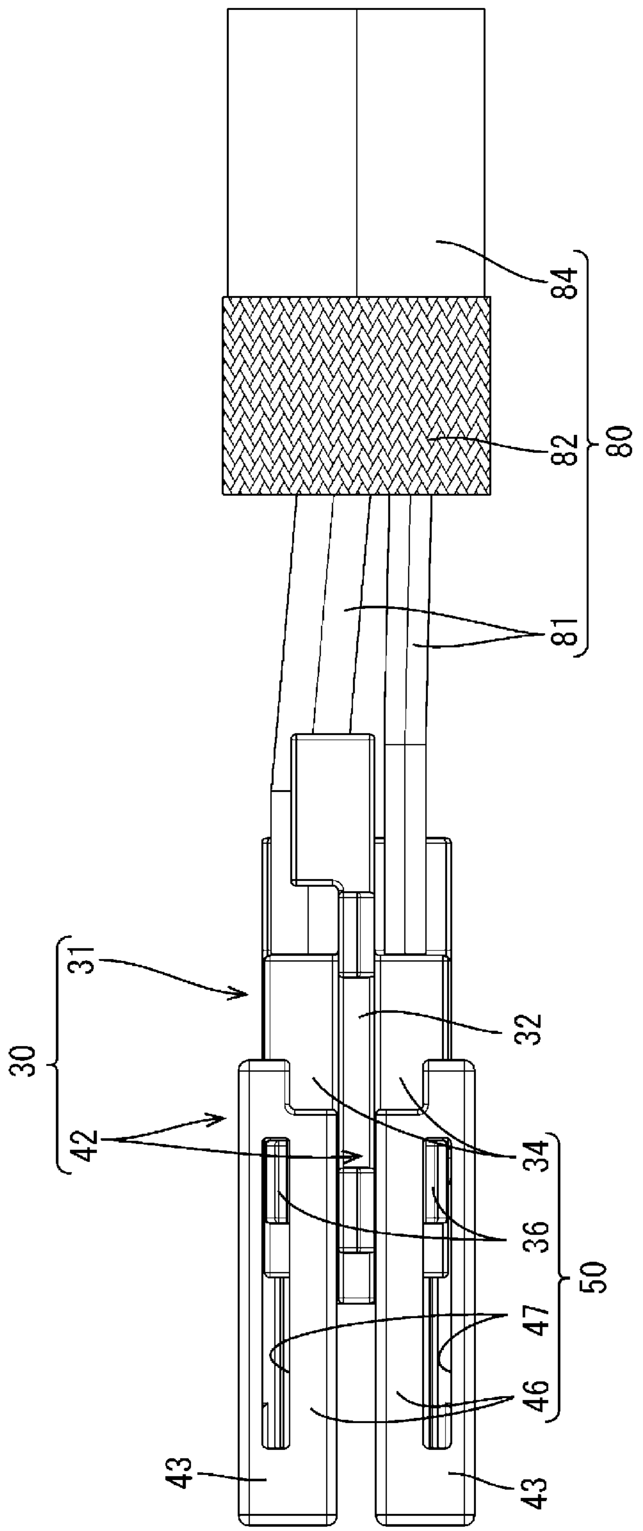
FIG. 6 is a side view showing the state where the pair of second housings are assembled at the protection position with respect to the first housing.

As shown in FIGS. 3, 4 and 6, the second side wall 46 includes fitting holes 47 into which the fitting portions 36 of the first side wall 34 are fit when the second housing 42 is assembled with the first housing 31. The fitting holes 47 penetrate through the second side walls 46 in the lateral direction and are formed to be rectangular in a side view. The fitting holes 47 are formed to be longer in the front-rear direction than the fitting portions 36.

Figure 9:
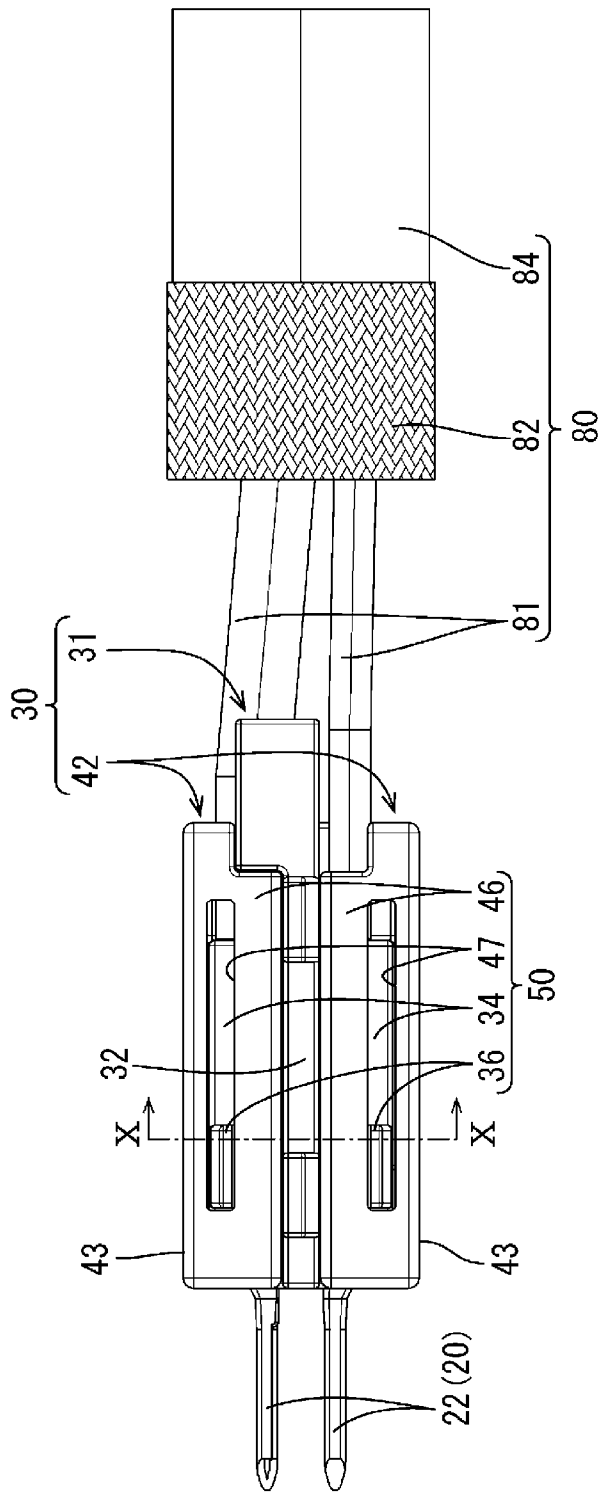
FIG. 9 is a side view showing the state where the pair of second housings are assembled at the exposed position with respect to the first housing.

Further, the second side walls 46 are arranged along the placing portion 32 of the first housing 31 as shown in FIGS. 6 and 9 when the second housing 42 is assembled with the first housing 31.

The front wall 48 is formed to be connected to a front end part of the protection wall 43 and those of the pair of second side walls 46. The front wall 48 stops the inner conductors 20 in front together with a front end part of the first housing 31 when the second housing 42 is assembled with the first housing 31.

Further, each second housing 42 is independently slidable in the front-rear direction between the protection position and the exposed position with respect to the first housing 31 by moving the fitting portions 36 in the front-rear direction in the fitting holes 47. When each second housing 42 moves in the front-rear direction, the pair of second side walls 46 smoothly move along the placing portion 32.

Figure 7:
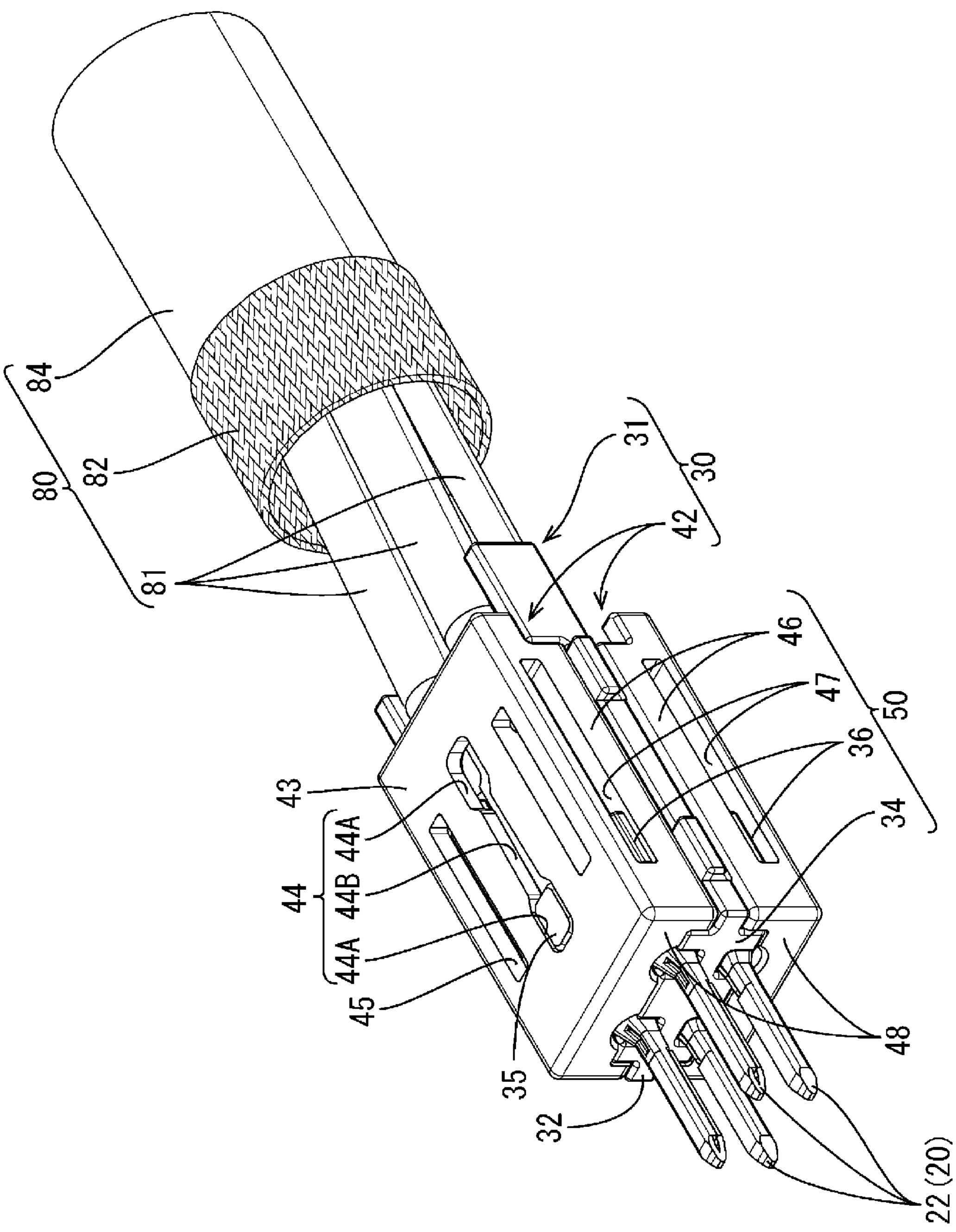
FIG. 7 is a perspective view showing a state where the pair of second housings are assembled at an exposed position with respect to the first housing.
Figure 8:
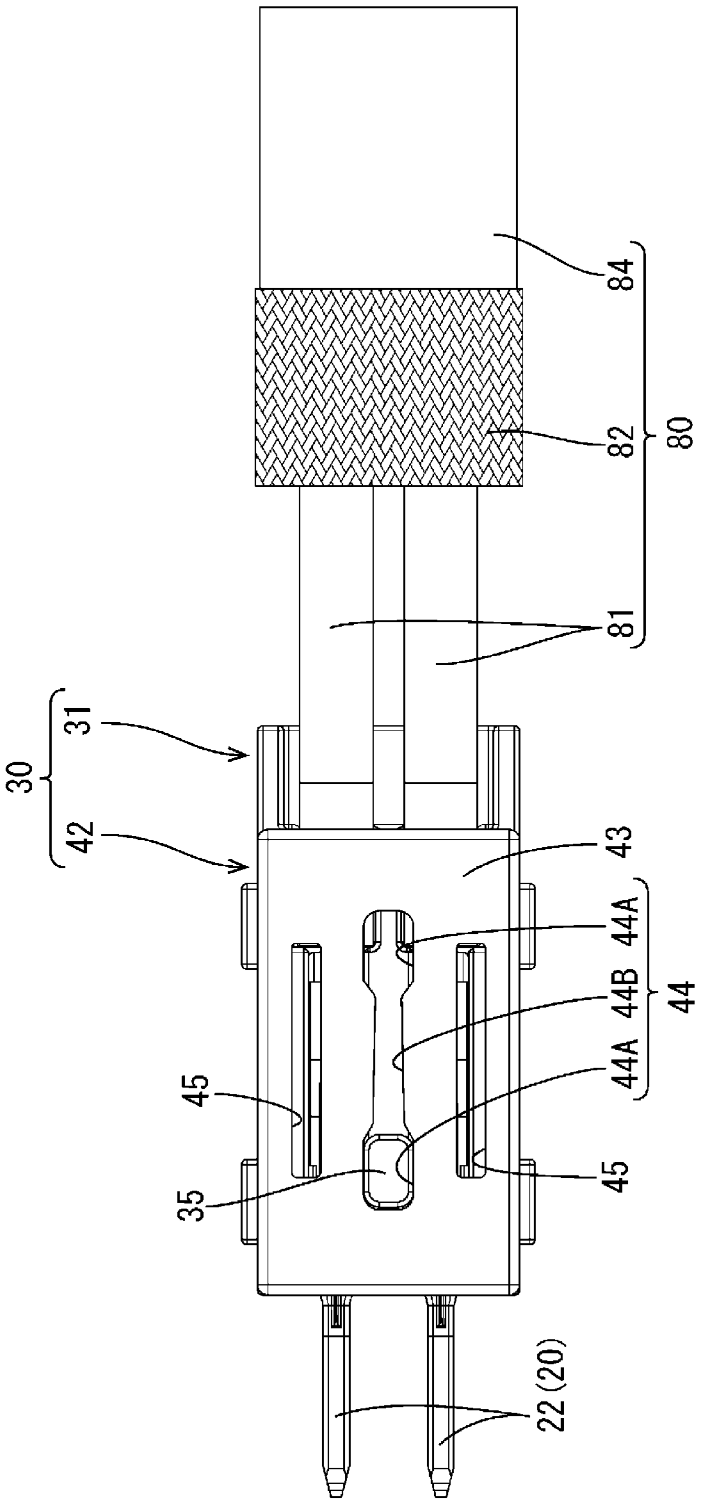
FIG. 8 is a plan view showing the state where the pair of second housings are assembled at the exposed position with respect to the first housing.

As shown in FIGS. 4 to 6, at the protection position, the fitting portions 36 are arranged in rear end parts of the fitting holes 47 and the protection wall 43 covers the terminal connecting portions 22 projecting forward from the terminal accommodating portions 37 from above or below. As shown in FIGS. 7 to 9, at the exposed position, the fitting portions 36 are arranged in front end parts of the fitting holes 47 and the protection wall 43 exposes the terminal connecting portions 22 projecting forward from the terminal accommodating portions 37.

Accordingly, in the first embodiment, the first side walls 34 of the first housing 31 and the second side walls 46 of the second housings 42 constitute a slide mechanism 50 by fitting the fitting portions 36 of the pair of first side walls 34 into the fitting holes 47 of the pairs of second side walls 46 as shown in FIGS. 4, 6, 7, 9 and 10. The fitting portions 36 on the first side walls 34 move in the fitting holes 47 in the second side walls 46, whereby the second housings 42 move in the front-rear direction between the protection position and the exposed position with respect to the first housing 31.

That is, the slide mechanism 50 of the first embodiment is formed in a dimensional range obtained by adding a tiny clearance dimension between the first side wall 34 and the second side walls 46 to the sum of a thickness L1 of the first side wall 34 and a thickness L2 of the second side walls 46.

Further, as shown in FIGS. 4 and 5, the second housing 42 is held at the protection position by holding the positioning protrusion 35 in a semi-locked state in the rear protrusion holding hole 44A of the positioning hole 44. On the other hand, as shown in FIGS. 7 and 8, the second housing 42 is held at the exposed position by holding the positioning protrusion 35 in a semi-locked state in the front protrusion holding hole 44A of the positioning hole 44. In the case of moving the second housing 42 between the protection position and the exposed position, a movement of the positioning protrusion 35 in the front-rear direction is allowed by the positioning protrusion 35 entering the narrow hole 44B to resiliently deform the inner wall of the narrow hole 44B toward the deformation holes 45.

[Outer Conductor 60]

The outer conductor 60 is formed into a rectangular tube shape by processing a conductive metal plate material.

As shown in FIGS. 1 and 2, the outer conductor 60 is formed by assembling an upper shell 61 and a lower shell 66 with each other in the vertical direction.

The upper shell 61 includes a ceiling plate 62, a pair of upper side plates 63 and a connection piece 65.

The ceiling plate 62 is in the form of a rectangular plate extending in the front-rear direction. The pair of upper side plates 63 are formed to extend downward from both lateral side edges of the ceiling plate 62. Each upper side plate 63 is in the form of a rectangular plate connected to the side edge of the ceiling plate 62 over an entire length. A linking plate 64 linking the upper side plates 63 in the lateral direction is formed on the lower edges of the front ends of the upper side plates 63.

The connection piece 65 is formed to be connected to the rear end edge of the ceiling plate 62. The connection piece 65 is arranged on the outer surface of the braided wire 82 of the shielded cable 80.

The lower shell 66 includes a bottom plate 67, a pair of lower side plates 68 and a crimping portion 69.

The bottom plate 67 is in the form of a rectangular plate extending in the front-rear direction. The pair of lower side plates 68 are formed to extend upward from both lateral side edges of the bottom plate 67. Each lower side plate 68 is formed to be connected to the side edge of the bottom plate 67 over an entire length.

The crimping portion 69 is formed into a hollow cylindrical shape on the rear end edges of the bottom plate 67 and the pair of lower side plates 68. The crimping portion 69 is crimped to the connection piece 65 of the upper shell 61 and the outer periphery of the braided wire 82. In this way, the outer conductor 60 is electrically connected to the braided wire 82 of the shielded cable 80.

Further, when the upper shell 61 and the lower shell 66 are assembled with each other, a tube portion 60A in the form of a rectangular tube is formed. As shown in FIGS. 2 and 10, the inner housing 30 is accommodated into the tube portion 60A.

When the inner housing 30 is accommodated into the tube portion 60A, the ceiling plate 62 of the upper shell 61 and the bottom plate 67 of the lower shell 66 are arranged along the upper and lower surfaces of the inner housing 30 and the upper side plates 63 of the upper shell 61 and the lower side plates 68 of the lower shell 66 are arranged along both lateral outer side surfaces of the inner housing 30 as shown in FIG. 10.

[Outer Housing 70]

The outer housing 70 is made of insulating synthetic resin.

As shown in FIG. 2, the outer conductor 60 connected to the front end part of the shielded cable 80 can be accommodated into the outer housing 70.

An unillustrated mating connector can enter a front end part of the outer housing 70. If the mating connector enters the outer housing 70, the mating connector presses the two second housings 42, whereby the second housings 42 move from the protection position to the exposed position. In this way, the terminal connecting portions 22 are exposed from the second housings 42 and electrically connected to unillustrated mating terminals provided in the mating connector.

The first embodiment is configured as described above. Next, functions and effects of the connector 10 are described.

Figure 12:
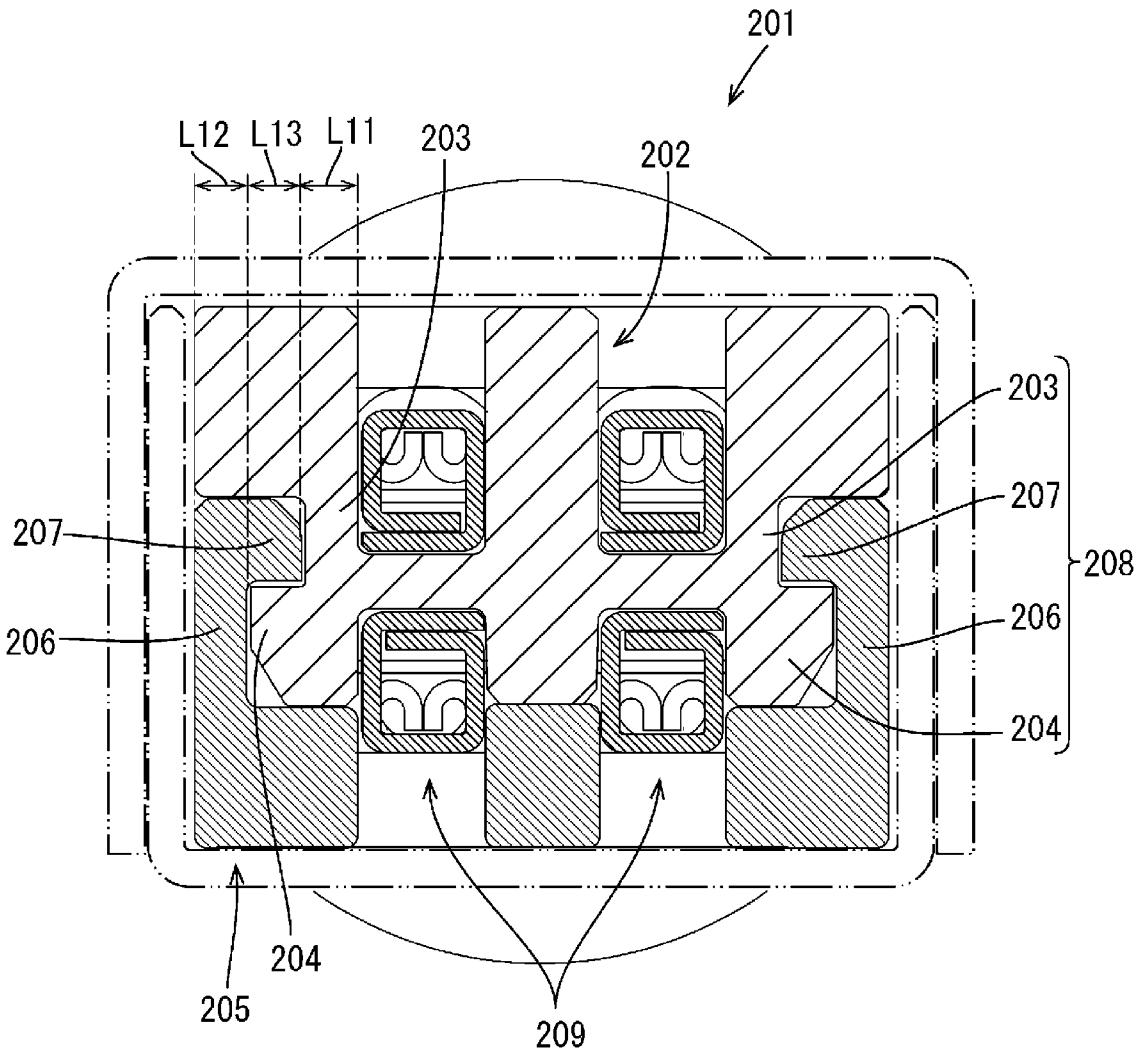
FIG. 12 is a section, corresponding to the cross-section of FIG. 10, of a conventional connector.

For example, a conventional connector 201 is shown in FIG. 12. The conventional connector 201 is configured by assembling a conventional first housing 202 and a conventional second housing 205 by locking first lock ribs 204 formed on a pair of first side walls 203 of the conventional first housing 202 and second lock ribs 207 formed on a pair of second side walls 206 of the conventional second housing 205 in the vertical direction.

In this conventional connector 201, the conventional second housing 205 slides with respect to the conventional first housing 202 by the conventional second lock ribs 207 sliding in the front-rear direction with respect to the conventional first lock ribs 204 with the conventional first lock ribs 204 and the conventional second lock ribs 207 held in contact with each other.

However, a conventional slide mechanism 208 for sliding the conventional second housing 205 with respect to the conventional first housing 202 needs to secure a locking margin L13 for locking the conventional first lock rib 204 and the conventional second lock rib 207 in the vertical direction between the conventional first side wall 203 and the conventional second side wall 206 in addition to a thickness L11 of the conventional first side wall 203 and a thickness L2 of the conventional second side wall 206. Thus, the slide mechanism 208 in the conventional connector 201 is enlarged in the lateral direction.

However, if the conventional second housing 205 is disabled to move with respect to the conventional first housing 202 because the conventional slide mechanism 208 is enlarged in the lateral direction, terminal connecting portions of conventional inner conductors 209 cannot be protected by the conventional second housing 205.

Accordingly, the present inventor and other researchers found out the configuration of the first embodiment as a result of diligent study to solve the above problem. That is, the first embodiment relates to the connector 10 provided with at least one inner conductor 20 and the inner housing 30, and the inner housing 30 is formed by assembling the first housing 31 and at least one second housing 42 with each other.

The first housing 31 includes the placing portion 32 and at least one first side wall 34, the inner conductor 20 includes the terminal connecting portion 22, the terminal connecting portion 22 is formed to extend forward, the inner conductor 20 is so arranged on the placing portion 32 that the terminal connecting portion 22 projects forward, and the first side wall 34 extends from the placing portion 32 toward the second housing 42.

The second housing 42 includes the protection wall 43 and at least one second side wall 46. The protection wall 43 is formed to be larger than the terminal connecting portion 22 projecting forward from the placing portion 32, and the second side wall 46 is arranged from the protection wall 43 to overlap the first side wall 34. The first and second side walls 34, 46 include the slide mechanism 50.

The slide mechanism 50 includes the fitting portion 36 on the first side wall 34 (either one of the first side wall 34 and the second side wall 46) to project toward the second side wall (other side wall) 46 and the fitting hole 47 in the second side wall 46, the fitting portion 36 being fit into the fitting hole 47, and the fitting hole 47 is formed to be longer in the front-rear direction than the fitting portion 36.

The second housing 42 is movable between the protection position where the terminal connecting portion 22 is covered by the protection wall 43 and the exposed position where the terminal connecting portion 22 is exposed from the protection wall 43 by the fitting portion 36 moving in the front-rear direction in the fitting hole 47.

That is, in the connector 10 of the first embodiment, the slide mechanism 50 is configured by fitting the fitting portion 36 on the first side wall 34 into the fitting hole 47 in the second side wall 46. The second housing 42 can be moved between the protection position and the exposed position with respect to the first housing 31 by moving the fitting portion 36 in the front-rear direction in the fitting hole 47.

That is, the mechanism 50 of the first embodiment is configured in the dimensional range obtained by adding the tiny clearance dimension between the first and second side walls 34, 46 to the sum of the thickness L2 of the first side wall 34 and the thickness L2 of the second side walls 46. In this way, the mechanism 50 can be reduced in size as compared to the conventional mechanism 208 of the conventional connector 201 shown in FIG. 12 (which further ensures the dimension L13 of the locking margin of the conventional first lock rib 204 and the conventional second lock rib 207 between the conventional first side wall 203 and the conventional second side wall 206 in addition to the sum of the thickness L11 of the conventional first side wall 203 and the thickness L12 of the conventional second side wall 206). Further, the connector 10 can be reduced in size by reducing the size of the mechanism 50.

The first embodiment further includes the outer conductor 60 for accommodating the inner housing 30, and the outer housing 60 includes the upper side plate 63 and the lower side plate 68 disposed outside and along the first and second side walls 34, 46.

Generally, if a ratio of a metal conductor increases around an inner conductor in which a signal flows, impedance is reduced. Here, a ratio of a metal conductor around the terminal connecting portion 22 of the inner conductor 20 of the first embodiment increases by being connected to the mating terminal. Therefore, there is a concern for an impedance reduction.

However, in the first embodiment, the outer conductor 60 is reduced in size according to the size reduction of the mechanism 50. That is, since the ratio of the metal conductor around the terminal connecting portion 22 is reduced, an impedance reduction at the position of the terminal connecting portion 22 can be suppressed as compared to the conventional connector 201.

Second Embodiment

Next, a second embodiment is described with reference to FIG. 11.

An inner housing 130 of the second embodiment is obtained by changing the lateral thickness of the separation wall 33 in the first embodiment and components, functions and effects common to the first embodiment are not described to avoid repetition. Further, the same reference signs are used for the same components as in the first embodiment.

Figure 11:
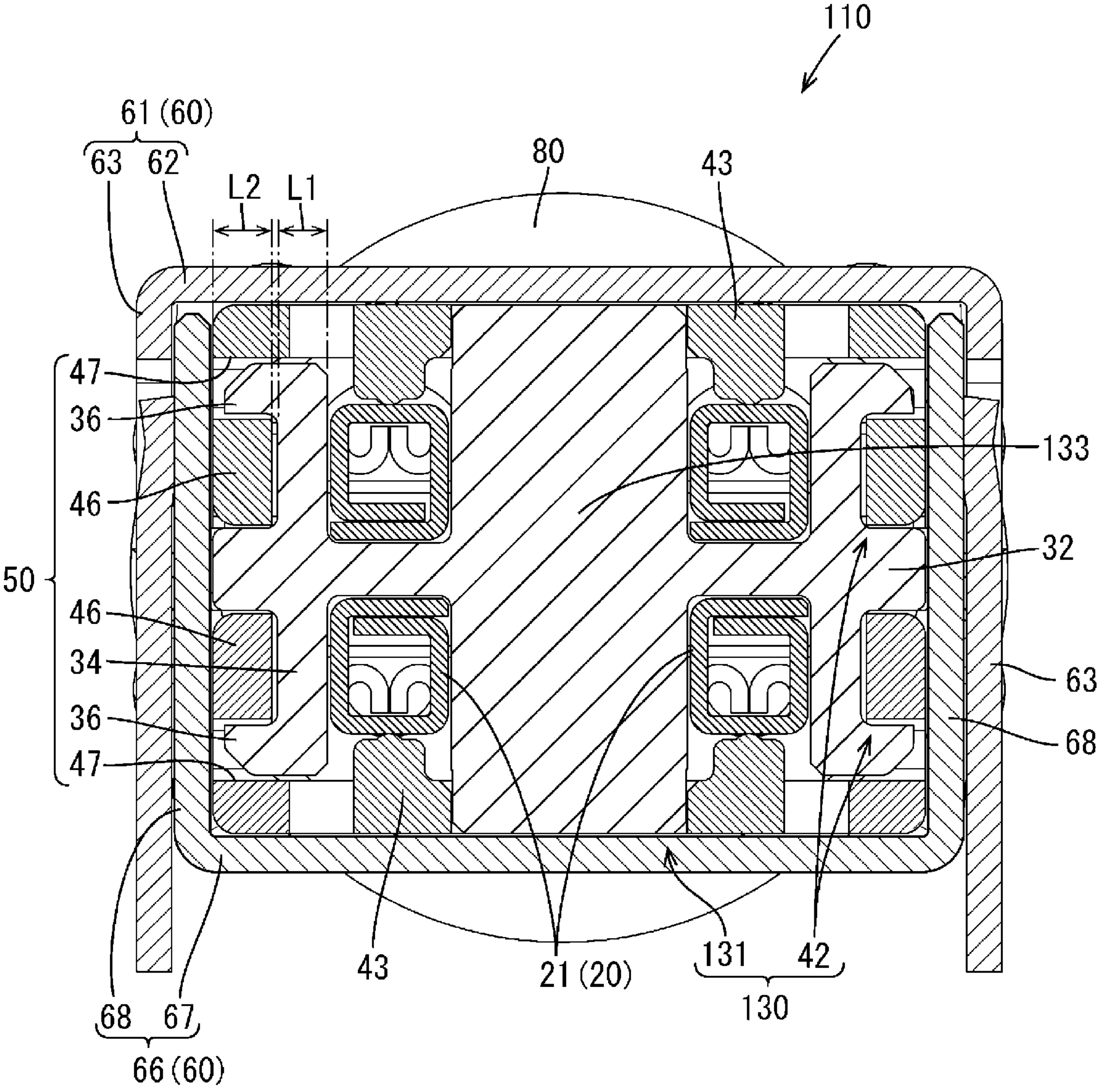
FIG. 11 is a section, corresponding to a cross-section of FIG. 10, of a connector of a second embodiment.

A separation wall 133 of the second embodiment has a lateral thickness, which is equal to or more than twice that in the first embodiment as shown in FIG. 11. Further, the lateral thickness of the separation wall 133 is larger than that of a slide mechanism 50 formed over a first side wall 34 and a second side wall 46.

Further, a lateral width of the inner housing 130 in the second embodiment is equal to that of the conventional connector 201 shown in FIG. 12.

That is, in the second embodiment, a lateral length of a connector 110 is equal to that of the conventional connector 201, but an interval between inner conductors 20 arranged in the lateral direction is larger.

As described in the first embodiment, if a ratio of a metal conductor increases around an inner conductor in which a signal flows, impedance is reduced. However, in the second embodiment, the lateral size of the connector is equal to that of the conventional connector 1, but the interval between the inner conductors 20 adjacent in the lateral direction is larger.

That is, even if terminal connecting portions 22 are connected to mating terminals to increase the ratio of the metal conductor around the terminal connecting portions 22, an impedance reduction can be suppressed as compared to the conventional connector 1 since the inner conductors 20 adjacent in the lateral direction are more spaced apart.

Other Embodiments (1) In the first and second embodiments, four inner conductors 20 are provided. However, without limitation to this, a connector may include three or less or five or more inner conductors.

(2) In the first and second embodiments, the outer conductor 60 and the outer housing 70 are provided. However, without limitation to this, a connector may not include any outer conductor or any outer housing.

(3) In the first and second embodiments, the fitting portion 36 is formed on the first side wall 34 and the fitting hole 47 is formed in the second side wall 46. However, without limitation to this, a fitting hole may be formed in a first side wall and a fitting portion may be formed on a second side wall.

(4) In the first and second embodiments, the outer conductor 60 is formed by assembling the upper shell 61 and the lower shell 66 with each other. However, without limitation to this, an outer conductor may be constituted by one member.

(5) In the first and second embodiments, the two second housings 42 are respectively independently slid with respect to the first housing 31. However, without limitation to this, the two second housings may be coupled and configured as one second housing.

LIST OF REFERENCE NUMERALS

10, 110: connector
20: inner conductor
21: terminal body
22: terminal connecting portion
24: wire connecting portion
30, 130: inner housing
31: first housing
32: placing portion
33, 133: separation wall
34: first side wall
35: positioning protrusion
36: fitting portion
37: terminal accommodating portion
42: second housing
43: protection wall
44: positioning hole
44A: protrusion holding hole
44B: narrow hole
45: deformation hole
46: second side wall
47: fitting hole
48: front wall
50: slide mechanism
60: outer conductor
60A: tube portion
61: upper shell
62: ceiling plate
63: upper side plate
64: linking plate
65: connection piece
66: lower shell
67: bottom plate
68: lower side plate
69: crimping portion
70: outer housing

80: shielded cable
81: wire
82: braided wire
84: outer sheath
201: connector
202: first housing
203: first side wall
204: first lock rib
205: second housing
206: second side wall
207: second lock rib
208: slide mechanism
209: inner conductor
L1, L11: thickness of first side wall
L2, L12: thickness of second side wall
L13: dimension of locking margin

What is claimed is:

1. A connector, comprising:

at least one inner conductor; and an inner housing, wherein:

the inner housing is formed by assembling a first housing and a second housing with each other, the second housing including an upper second housing and a lower second housing, the first housing includes a placing portion and at least one first side wall, the inner conductor includes a terminal connecting portion, the terminal connecting portion is formed to extend forward, the inner conductor is so arranged on the placing portion that the terminal connecting portion projects forward, the first side wall includes an upper first side wall and a lower first side wall extending above and below the placing portion toward the upper second housing and the lower second housing, respectively, the upper first side wall and the lower first side wall are formed at positions spaced inward of a lateral side edge of the placing portion, each of the upper second housing and the lower second housing includes a protection wall and at least one second side wall, the protection wall is formed to be larger than the terminal connecting portion projecting from the placing portion, the second side wall of the upper second housing is arranged to overlap the upper first side wall and the second side wall of the lower second housing is arranged to overlap the lower first side wall, the first and second side walls include a slide mechanism, the slide mechanism includes a fitting portion on either one of the first and second side walls to project toward the other side wall and a fitting hole in the other side wall, the fitting portion being fit into the fitting hole, the fitting hole is formed to be longer in a front-rear direction than the fitting portion, and wherein in an assembled state, the second side walls of the upper and lower second housings are positioned along upper and lower surfaces of the placing portion, respectively.

2. The connector of claim 1, wherein:

two inner conductors are arranged side by side in an overlapping direction of the first and second side walls on the placing portion, and a separation wall having a thickness larger than that of the slide mechanism is arranged between the adjacent inner conductors.

3. The connector of claim 1, wherein the first housing includes at least one separation wall, the separation wall together with the placing portion, the at least one first side wall, and the protection wall forming a terminal accommodating portion configured to accommodate a terminal body of the inner connector.

4. The connector of claim 3, wherein the separation wall includes a positioning protrusion configured to extend through the protection wall via a positioning hole in the protection wall.

5. The connector of claim 1, wherein when the terminal connecting portion is in a protection position, the fitting portion is arranged at a rear end of the fitting hole, and when the terminal connecting portion is in an exposed position, the fitting portion is arranged at a front end of the fitting hole.

* * * * *